United States Patent [19]

Trond et al.

[11] Patent Number: 4,568,479
[45] Date of Patent: Feb. 4, 1986

[54] METHOD FOR PREPARING PHOSPHOR ADAPTED FOR PRODUCING PHOTOSENSITIVE LAYERS FROM AN ACID SLURRY

[75] Inventors: Stephen S. Trond, East Hempfield Township, Lancaster County; Martin R. Royce, Manheim Township, Lancaster County, both of Pa.

[73] Assignee: RCA Corporation, Princeton, N.J.

[21] Appl. No.: 651,315

[22] Filed: Sep. 17, 1984

[51] Int. Cl.$^4$ .............................................. C09K 11/475
[52] U.S. Cl. .......................... 252/301.6 P; 252/301.36; 252/301.4 R; 252/301.4 S; 252/301.6 S; 427/64; 427/67
[58] Field of Search .................................... 427/64, 67; 252/301.6 P, , 301.4 S, 301.36 R, 301.6 S

[56] References Cited

U.S. PATENT DOCUMENTS

| | | | |
|---|---|---|---|
| 2,697,668 | 12/1954 | Crosby et al. | 252/301.6 P |
| 3,598,629 | 8/1971 | Mellar et al. | 117/33.5 |
| 3,676,177 | 7/1972 | Hammond et al. | 117/33.5 |
| 3,887,725 | 6/1975 | Halstead et al. | 427/67 |
| 3,919,108 | 11/1975 | Wilcox et al. | 252/301.3 |
| 3,954,657 | 5/1976 | Forest et al. | 252/301.4 |
| 4,049,845 | 9/1977 | Lozier et al. | 427/68 |
| 4,276,363 | 6/1981 | Manabe et al. | 427/64 X |

*Primary Examiner*—Jack Cooper
*Attorney, Agent, or Firm*—Eugene M. Whitacre; Dennis H. Irlbeck; LeRoy Greenspan

[57] ABSTRACT

Prior to preparing an acid phosphor slurry for use in preparing dry photosensitive phosphor layers, particulate yttrium, lanthanum and/or gadolinium oxysulfide or vanadate phosphor is mixed with essentially water-insoluble particulate zinc phosphate in an aqueous medium. Then, the particle mixture is removed and dried. The invention includes both the novel method and the product of the novel method.

9 Claims, No Drawings

4,568,479

METHOD FOR PREPARING PHOSPHOR ADAPTED FOR PRODUCING PHOTOSENSITIVE LAYERS FROM AN ACID SLURRY

BACKGROUND OF THE INVENTION

This invention relates to a novel method for preparing phosphor that is better adapted to be deposited subsequently in dry photosensitive layers from an aqueous acid slurry, and to the product of that method. The product may be used, for example, to prepare a luminescent viewing screen for a cathode-ray tube by the slurry-direct photographic process.

The slurry-direct photographic process is described in U.S. Pat. Nos. 3,406,068 to H. B. Law, 3,313,643 to P. B. Branin, and 3,269,838 to T. A. Saulnier, for example. In the common practice of that process, an aqueous slurry is prepared containing the desired particulate phosphor; a water-soluble, photosensitizable binder for the phosphor, such as polyvinyl alcohol; and a water-soluble dichromate photosensitizer for the binder. The slurry is coated on the inner surface of the viewing window of the tube and then dried, producing the photosensitive layer. The dry photosensitive layer is exposed to a pattern of actinic radiation to insolubilize or harden selected areas of the layer. The exposed layer is then flushed with water to remove the unhardened areas of the layer, while retaining the insoluble, hardened areas of the layer in place, thereby producing the desired screen structure.

Acid slurries of some phosphors, particularly phosphors containing yttrium, lanthanum and/or gadolinium cations in the host crystal thereof, such as europium-activated yttrium oxysulfide, may form dry photosensitive layers which are said to be supersensitive. Supersensitive layers require far less exposure time to achieve a desired amount of hardening than layers that are not supersensitive. The supersensitivity is not consistent or predictable, and is frequently erratic, differing in some uncontrolled way from batch to batch of the same slurry composition. It is believed that, when yttrium oxysulfide phosphor is mixed in different batches of aqueous slurry, different concentrations of free yttrium cations are produced in the slurries. These cations are either leached from the surface of the phosphor or are formed by a minimal dissolution of the phosphor. Concentrations of about 100 ppm (parts per million) and higher of yttrium cations can produce dry layers that are unpredictably supersensitive, and thereby make it impossible to produce the desired screen structure in a precise and controlled manner. In general, slurries with free yttrium cation concentrations of less than 100 ppm will produce acceptable dry photosensitive layers. However, slurries with free cation concentrations that differ substantially from one slurry batch to another can produce erratic and unpredictable results when photoexposing layers are made from these slurries.

It has been suggested that supersensitivity occurs when a substantial amount of dichromate photosensitizer converts to chromate in the slurry and/or the layer, which causes the photosensitive layer to slowly harden without actinic radiation prior to being photoexposed. This effect, which is sometimes called "dark hardening," lowers the amount of light needed to achieve the desired amount of hardening by photoexposure in a manner analogous to a flood exposure. Conversion of dichromate to chromate in conjunction with dark hardening has been observed with dry photosensitive layers made from alkaline phosphor slurries (pH above 7.0).

In acid phosphor slurries (pH below 7.0), dichromate does not convert appreciably to chromate. However, the acidity of the slurry does, to a larger extent than in alkaline slurries, attack the phosphor particles in the slurry. It is believed that, in dry photosensitive layers of phosphors containing yttrium, lanthanum and/or gadolinium, such as europium-activated yttrium oxysulfide, and produced from an acid slurry, supersensitivity is accelerated by the presence therein of water-soluble salts of the same cations as are present in the cation portion of the phosphor. In the case of activated yttrium oxysulfide or vanadate phosphors, for example, salts of yttrium are present which accelerate dark hardening. The principal source of these salts is believed to be the phosphor itself which may have been incompletely washed after it was synthesized or salvaged, or which may have dissolved in the acid slurry.

In order to reduce the supersensitivity and dark hardening of photosensitive phosphor layers made from an aqueous slurry, it has been suggested to add to the slurry a soluble substance that combines with the cations of the soluble salts described above and renders these cations inactive in the dry photosensitive layer that is subsequently formed from that slurry. The soluble substance may be a chelating agent or a complexing agent, for example. Alternatively, the phosphor particles may be washed with a solution of the soluble substance before incorporation into the slurry. It has also been suggested to coat or encapsulate the phosphor particles with a substance that protects the particles from dissolution in the slurry. The prior suggestions have had only partial success at best in acid slurries and are considered to be inadequate for accurate process control in modern automated manufacturing facilities.

SUMMARY OF THE INVENTION

The phosphors produced by the novel method are adapted for use in preparing dry photosensitive phosphor layers from aqueous acid slurries (pH below 7.0) containing particulate phosphor whose cation component includes cations of yttrium, lanthanum and/or gadolinium, a photosensitizable binder for the phosphor, and a dichromate sensitizer for the binder. In the novel method, after the phosphor has been washed free of soluble salts produced from either a synthesis process or a salvage process, the particulate phosphor and particles of essentially insoluble zinc phosphate are mixed together in an aqueous medium, the mixture is removed from the medium and is dried. The weight ratio of zinc phosphate to phosphor is in the range of about 0.001 to 0.010.

It is hypothesized that, both in the aqueous medium and in the aqueous slurry, the zinc phosphate particles act as scavengers and that free cations from the phosphor are absorbed onto their surfaces and held there as insoluble phosphate of the free cation. The free cation concentration in the phosphor slurry is below 100 ppm and usually below 50 ppm. Addition of insoluble zinc phosphate particles to the slurry has not reduced the free cation concentration below 100 ppm in the slurry, nor has washing or rinsing the phosphor with an aqueous solution of a soluble phosphate. By the novel method, the added insoluble zinc phosphate particles are not detrimental to the screening characteristics of the phosphor or to the performance of the viewing screens produced with the phosphor. The method can be used for pigmented phosphors or non-pigmented phosphors, and for virgin or salvaged phosphors. The product of the novel method, when incorporated into aqueous acid phosphor slurries, as described above, can consistently produce dry photosensitive phosphor layers that are not supersensitive, but have a consistent practical photosensitivity.

DETAILED DESCRIPTION OF THE PREFERRED EMBODIMENT

The product of the novel method may be used to prepare viewing screens for cathode-ray tubes by photodeposition and may be employed in acid slurries containing phosphors of any emission characteristic. However, for purposes of this detailed description, the novel method is described with respect to the red-emitting phosphor for the screen which is described in U.S. Pat. No. 3,423,621 to M. R. Royce. That patent describes a shadow-mask-type cathode-ray tube for use in color television, which tube includes a viewing screen comprising arrays of blue-emitting, green-emitting and red-emitting phosphor elements on the inner surface of the viewing window of the tube. In a typical viewing screen, the blue-emitting is a silver-activated zinc sulfide, the green-emitting phosphor is a copper-and-aluminum-activated zinc-cadmium sulfide, and the red-emitting phosphor is an europium-activated yttrium oxysulfide (also called yttrium europium oxysulfide) phosphor. The blue-emitting, green-emitting and red-emitting fields are photodeposited sequentially on the viewing window using the slurry-direct-photographic method. Generally, an aqueous acid slurry containing the desired phosphor is coated on the inner surface of the viewing window and dried. The dry coating is exposed to ultraviolet light projected through the shadow mask of the tube, and then is developed by flushing with water.

Except for the preparation of the red-emitting phosphor, the methods of fabricating the tube are known. Also, the tube structure is known. Therefore, the following description need only discuss the preparation of the red-emitting phosphor and its effect on the known structures and processes. The following Examples 1 and 2 describe in detail the steps in embodiments of the novel method for red-emitting europium-activated yttrium oxysulfide phosphor particles that are coated with red pigment particles by the latex method disclosed in U.S. Pat. No. 4,049,845 to G. S. Lozier et al. Example 1 is for virgin phosphor, and Example 2 is for salvage phosphor.

EXAMPLE 1

After a batch of virgin europium-activated yttrium oxysulfide phosphor particles is synthesized and thoroughly washed to remove unreacted and by-product material, it is slurried in water. An aqueous suspension containing 0.5 weight % $Fe_2O_3$ pigment with respect to the weight of phosphor is mixed into the slurry. Then 1.7 ml per pound of phosphor of a 50 weight % suspension of latex is stirred into the slurry. The pH of the slurry is adjusted to 1.8±0.2 with hydrochloric acid and permitted to digest for 45 minutes to latex and pigment the phosphor particles. Then, the phosphor is permitted to settle, and the supernatant liquid is decanted. Deionized water is added, the phosphor settled, and the liquid decanted, and again repeated until the pH of the supernatant liquid is above about 4.0. When the pH is above 4.0, an aqueous suspension containing 0.3 weight % of essentially water insoluble particulate zinc orthophosphate with respect to the weight of the phosphor is stirred into the slurry, and stirring is continued for about 30 minutes. The mixture of solids is settled, the supernatant liquid is decanted, and the solids mixture is dried on trays in air at about 160° C. for 24 hours. The dry mixture is sieved and is ready for incorporation into a slurry for producing dry photosensitive layers.

EXAMPLE 2

After a quantity of salvage or recycled iron-oxide-pigmented europium-activated yttrium oxysulfide phosphor particles has been baked at about 400° C. in air to remove organic matter, a 300-pound batch of the baked product is digested in water containing 25 pounds calcium hypochlorite and 12.5 pounds sodium hydroxide for about one hour to oxidize all of the zinc compounds that are present. The phosphor is settled and the supernatant liquid decanted. The phosphor is resuspended in water, settled and decanted. The phosphor is again resuspended in water, the pH of the suspension adjusted to about 0.9±0.1 with hydrochloric acid and digested for about 30 minutes. The phosphor is then settled and the supernatant liquid decanted. The phosphor is again resuspended in water, settled and decanted several times until the pH of the suspension is above 4.0. At this point, latex and a desired concentration of iron oxide pigment are added to the suspension as in Example 1, to relatex the phosphor and to correct pigmentation if necessary. Then follow the same procedure described in Example 1 subsequent to the latexing and pigmenting steps.

SOME GENERAL CONSIDERATIONS AND ALTERNATIVES

In Examples 1 and 2, the mixing of zinc orthophosphate particles with phosphor in an aqueous medium has the effect of modifying the phosphor particles so that a dry photosensitive phosphor layer, subsequently made from an aqueous acid slurry of the phosphor, is not supersensitive. Dry photosensitive phosphor layers similarly made with phorphors not so treated are usually irregularly supersensitive, but sometimes are not.

It is believed that any essentially water-insoluble particulate zinc phosphate can be used. Zinc orthophosphate is preferred. The weight of the zinc phosphate that is added should be in the range of 0.1 to 1.0 percent of the weight of the phosphor. The preferred zinc phosphate is a technical grade of zinc orthophosphate marketed by A. D. Mackay Rare Metals & Chemicals Co., Darien, Conn.

Other water-insoluble phosphates and water-soluble phosphates have been found to be ineffective or less effective. Precipitating a phosphate on the surface of the phosphor particles has been found to be ineffective. Mixing the particulate zinc phosphate with phosphor during other steps, such as subsequently during the preparation or after the preparation of the photosensitive phosphor slurry, is also less effective in reducing subsequent supersensitivity in the dry photosensitive layer.

The novel method has been found to be effective with cation-activated phosphors having an anion component, particularly oxysulfide or vanadate and a cation component, particularly trivalent yttrium, lanthanum and/or gadolinium. The phosphor may have any activator. Also, the phosphor particles may have coatings of pigment particles. It is believed that supersensitivity is related to the concentration of free trivalent cations of the phosphor in the photosensitive phosphor slurry used to make the dry phosphor layer. Such slurries ordinarily have free trivalent cation concentrations above 200 ppm, sometimes above 500 ppm. The novel method produces photosensitive slurries with free trivalent cation concentrations that are consistently well below 100 ppm. This produces, in dry photosensitive layers containing these phosphors, consistent photosensitivity from batch to batch, thereby obviating the need to readjust exposure times for the layers to compensate for variations in photosensitivity.

The following Table presents the measured $Y^{+3}$ (free trivalent yttrium cation) concentrations in ppm in accelerated tests on aqueous suspensions of commercial europium-activated yttrium oxysulfide phosphor previously treated with the indicated material.

TABLE

| Sample | Phosphate Treatment | ppm $Y^{+3}$ |
|---|---|---|
| 1. | Untreated | 214 |
| 2. | Novel method, early test | 53 |
| 3. | Novel method, early test, modified | 35 |
| 4. | Novel method, optimized | 0 |
| 5. | Soluble $(NH_4)_2HPO_4$ | 214 |
| 6. | Soluble $Na_3PO_4$ | 221 |
| 7. | $H_3PO_4$ | 330 |
| 8. | HCl, pH 2.0 | 123 |
| 9. | 8. plus $Ca(OCl)_2$ | 125 |
| 10. | 9. plus novel method | 2 |
| 11. | 0.7% $MgNH_4PO_4$ | 98 |
| 12. | 0.7% $CaHPO_4$ | 129 |

What is claimed is:

1. A method for preparing a particulate phoshor comprising an activated host crystal having a cation component and an anion component, said cation component consisting essentially of at least one member of the group consisting of trivalent yttrium, trivalent lanthanum and trivalent gadolinium, and said anion component consisting essentially of oxysulfide or vanadate, said particulate phosphor being especially adapted for being deposited subsequently in a dry photosensitive layer from an aqueous acid slurry comprising said phosphor, an organic binder for said phosphor and a dichromate photosensitizer for said binder, the steps comprising providing an aqueous suspension of particles of said phosphor, adding particles of an essentially water-insoluble zinc phosphate to said suspension to form a mixture of the phosphor particles and the essentially water-insoluble zinc phosphate particles and then removing and drying said mixture of particles from said suspension.

2. The method defined in claim 1 wherein said cation component consists essentially of trivalent yttrium.

3. The method defined in claim 1 wherein said phosphor is activated with at least one rare earth metal cation.

4. The method defined in claim 1 wherein said phosphate is zinc orthophosphate.

5. A method for preparing a slurry of particulate phosphor comprising an activated host crystal selected from the group consisting of yttrium oxysulfide and yttrium vanadate, said particulate phosphor being especially adapted for being deposited subsequently in a dry photosensitive phosphor layer from an aqueous acid slurry comprising said phosphor, an organic binder for said phosphor and a dichromate photosensitizer for said binder, the steps comprising providing an aqueous suspension of particles of said phosphor, adding particles of essentially water-insoluble zinc phosphate to said suspension to form a mixture of the phosphor particles and the essentially water-insoluble zinc phosphate particles removing and drying said mixture of particles from said suspension, and then incorporating said dried mixture of particles in an aqueous acid slurry.

6. The method defined in claim 5 wherein said phosphor is yttrium oxysulfide.

7. The method defined in claim 5 wherein said phosphate is zinc orthophosphate.

8. The method defined in claim 7 wherein the weight ratio of zinc orthophosphate to phosphor is in the range of about 0.001 to 0.010.

9. The method defined in claim 7 wherein the weight ratio of zinc orthophosphate to phosphor is about 0.003.

* * * * *